(12) United States Patent
Jaradat

(10) Patent No.: US 6,948,778 B1
(45) Date of Patent: Sep. 27, 2005

(54) REMOVABLE REAR JUMP SEAT

(75) Inventor: Waseem Jaradat, Dearborn, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/085,422

(22) Filed: Mar. 21, 2005

(51) Int. Cl.[7] .............................................. A47C 7/00
(52) U.S. Cl. ................................ 297/440.1; 296/65.03
(58) Field of Search ........................... 297/250.1, 254, 297/440.2, 440.1, 14, 230.1, 440.21, 440.22; 296/65.03, 65.13, 65.01

(56) References Cited

U.S. PATENT DOCUMENTS

| | | | |
|---|---|---|---|
| 4,527,828 A * | 7/1985 | Groce et al. .............. | 296/65.09 |
| 4,771,507 A * | 9/1988 | Draplin et al. ................. | 16/297 |
| 4,971,380 A * | 11/1990 | Cote et al. ..................... | 296/63 |
| 5,344,212 A * | 9/1994 | Muller et al. ................ | 297/245 |
| 6,739,643 B1 | 5/2004 | Rock et al. | |
| 6,843,526 B2 * | 1/2005 | Honda et al. .................. | 297/14 |

* cited by examiner

Primary Examiner—Milton Nelson, Jr.
(74) Attorney, Agent, or Firm—Ralph E. Smith

(57) ABSTRACT

A removable jump seat assembly for an automotive vehicle has a jump seat, and a support structure for the jump seat. The support structure includes at least one support bar having a first terminal portion connected to the jump seat. A bracket is mounted on a rear upright wall of the vehicle. A releasable latch assembly releasably secures the support bar to the bracket. The latch assembly includes a housing on a second terminal portion of the support bar. Latch fingers in the housing are engageable in slots in the bracket to connect the support bar to the bracket. A spring urges the latch fingers into the slots. Release members carried by the housing are adapted to withdraw the latch fingers from the slots against the force of the spring.

12 Claims, 4 Drawing Sheets

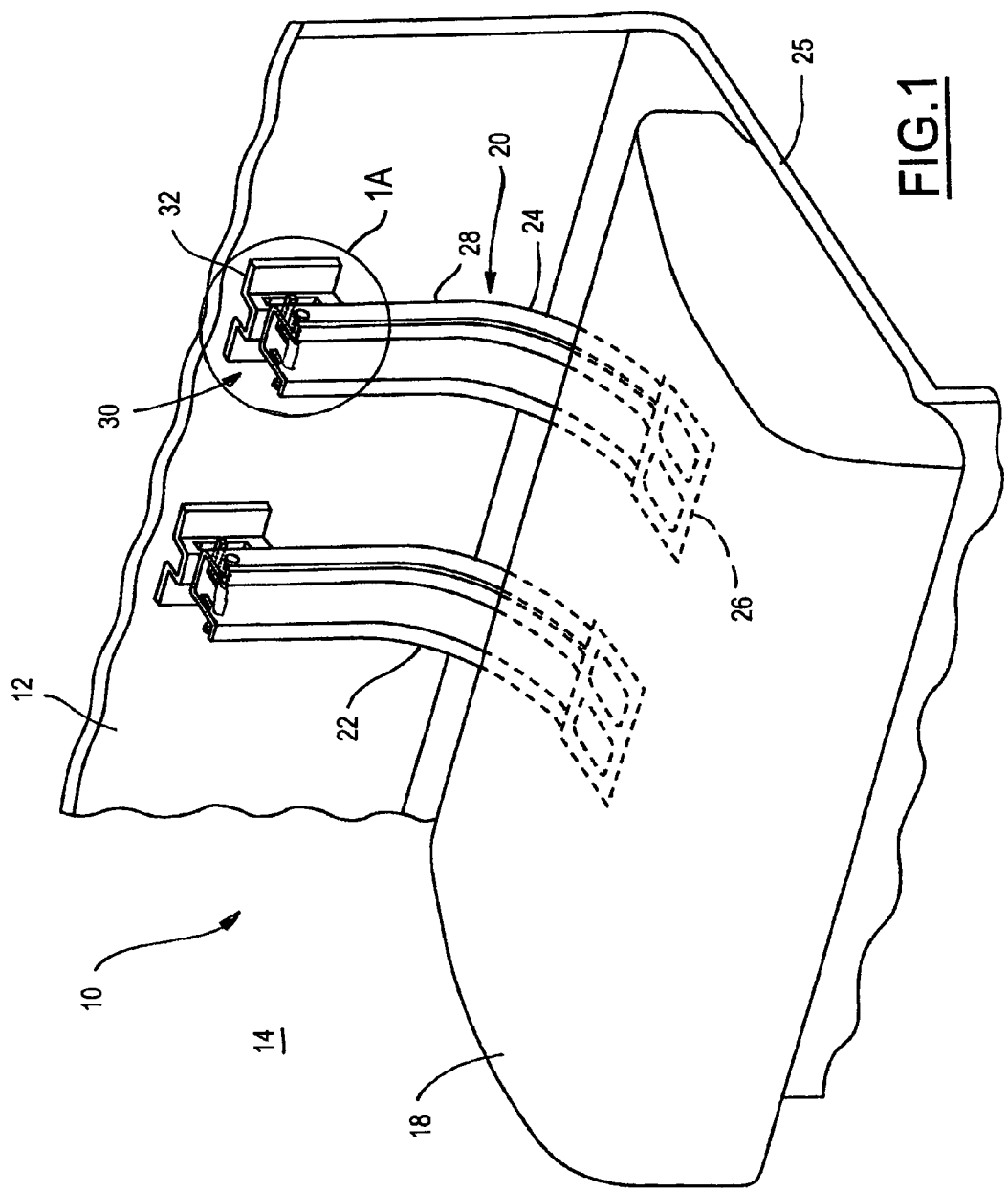

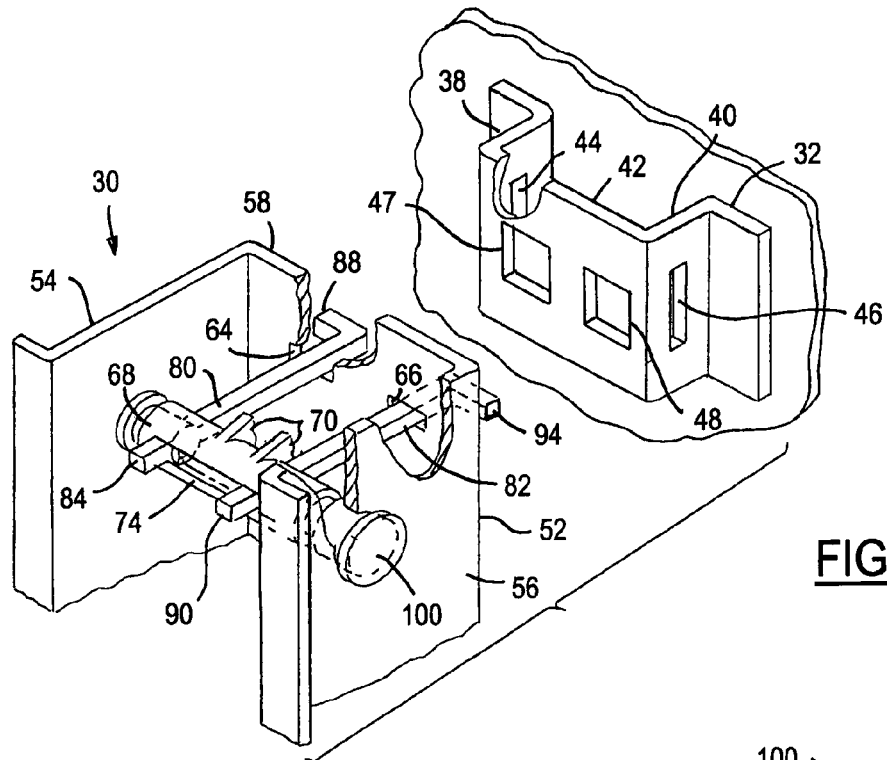
FIG. 1A
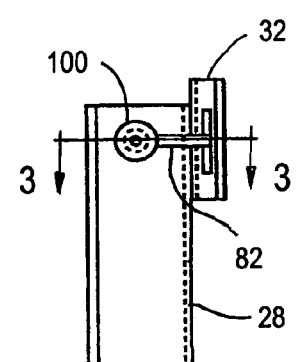
FIG. 2
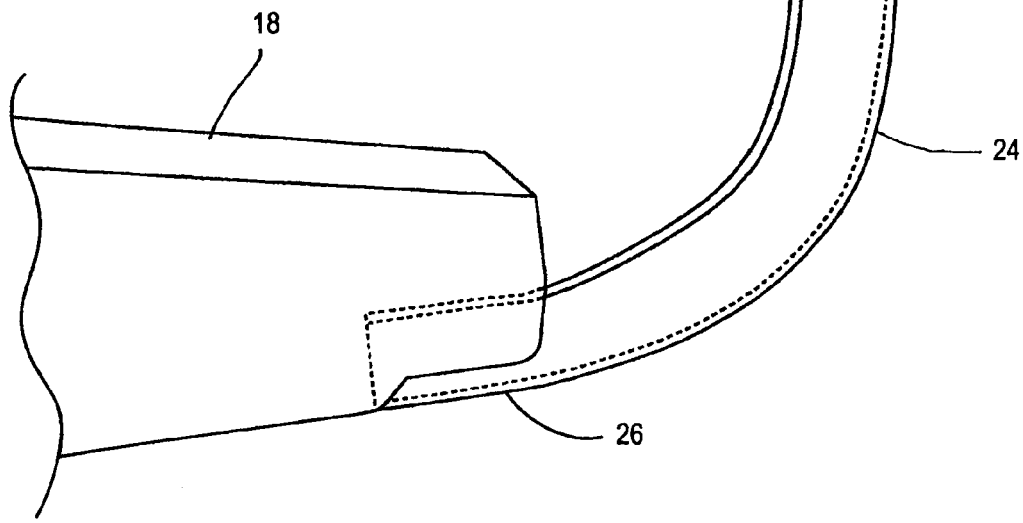

US 6,948,778 B1

REMOVABLE REAR JUMP SEAT

FIELD OF THE INVENTION

The present invention relates to automotive vehicle seating and more particularly to a jump seat for an automotive vehicle.

BACKGROUND OF THE INVENTION

Automotive vehicles, especially commercial vehicles and pick-up trucks, often have a cargo space behind conventional seating. At times it is desired to provide additional seating, often in the form of a jump seat, in the cargo space. At other times, a jump seat is not desired because it takes up space that could otherwise be used for cargo.

SUMMARY OF THE INVENTION

In accordance with the present invention, a jump seat assembly is provided which is completely removable. More specifically, a support structure for the jump seat is provided, including at least one support bar having a first terminal portion connected to the jump seat. A releasable latch assembly secures the support bar to a bracket on a rear wall of the vehicle. The latch assembly has a housing on a second terminal portion of the support bar. A latch finger in the housing is engageable in a recess in the bracket to connect the support bar to the bracket. An actuator urges the latch finger into the recess. The latch finger can be withdrawn from the recess against the force of the actuator by a release member.

In the preferred embodiment to be described, the bracket has laterally spaced apart side flanges, with a recess in the form of a slot in each flange. Two latch fingers are provided, one engageable in one of the slots and another engageable in the other of the slots. An actuator having a spring extends between the two latch fingers, to urge them into the respective slots. Release members are provided to withdraw the latch fingers from the slots.

It is an object of this invention to provide a removable jump seat assembly having one or more of the foregoing features and capabilities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a jump seat, support bars for the jump seat, releasable latch assemblies on the support bars, and a wall bracket, all constructed in accordance with the invention;

FIG. 1A is an enlargement of the structure within the circle 1A in FIG. 1, with the parts separated for clarity;

FIG. 2 is a side view showing the one of the support bars attached to the bracket by the latch assembly;

DETAILED DESCRIPTION OF THE PREFERRED EMBODIMENT

Figure 3:
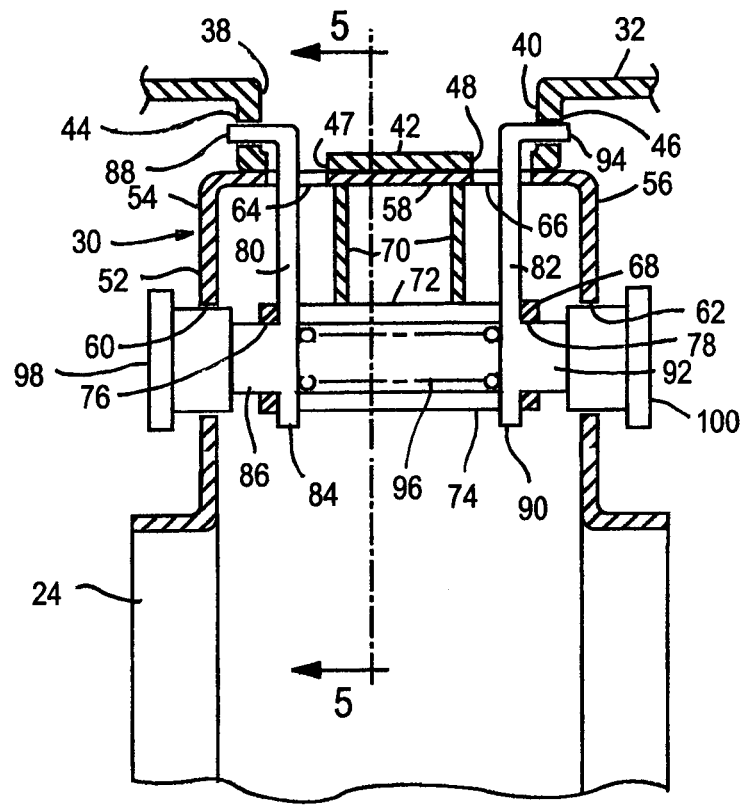
FIG. 3 is a sectional view taken on the line 3—3 in FIG. 2, showing fingers of the latch assembly extended to latch on to the bracket.
Figure 4:
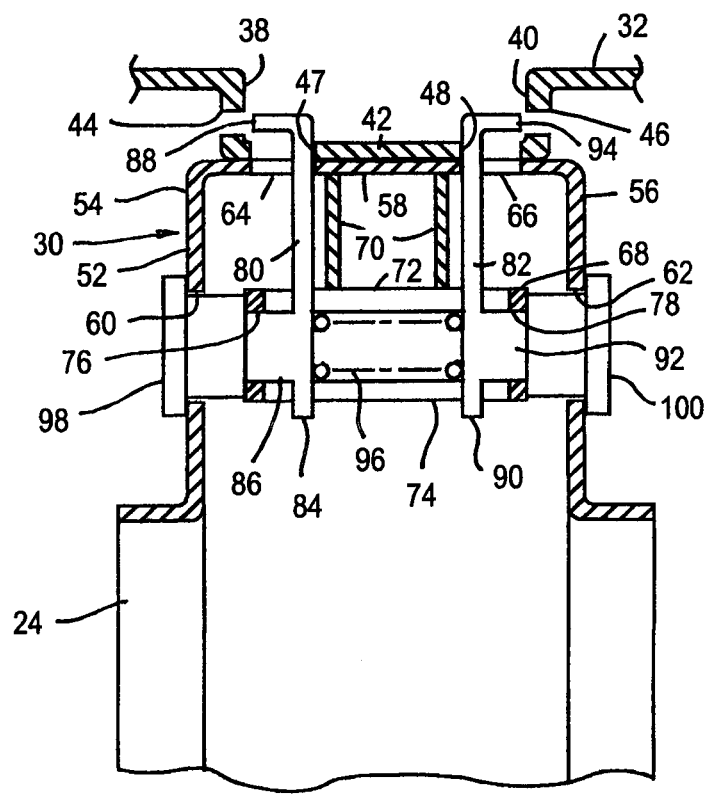
FIG. 4 is a sectional view similar to FIG. 3, but shows the fingers retracted.
Figure 5:
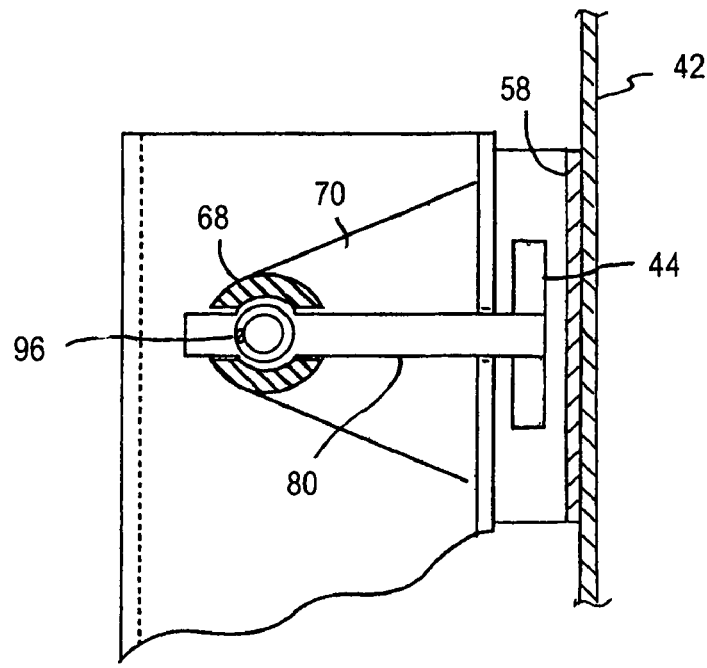
FIG. 5 is a sectional view taken on the line 5—5 in FIG. 3.

The following description of the preferred embodiment is merely exemplary in nature and is in no way intended to limit the invention, its application, or uses.

Referring now more particularly to the drawings and especially FIG. 1, a removable jump seat assembly 10 is shown mounted on the inner side of a rear upright wall 12 in a cargo space 14 of an automotive vehicle.

The jump seat assembly 10 has a jump seat 18 mounted on the wall 12 by support structure 20. The support structure includes a pair of laterally spaced apart support bars 22 and 24 of steel or other relatively rigid material. The support bars 22 and 24 are identical so a description of one will suffice for both. The jump seat 18 rests upon a bench 25.

Each bar 22, 24 is generally arcuate in shape and has a generally horizontal forwardly extending terminal portion 26 which is secured, as by a permanent attachment, to the underside of the jump seat 18. Each support bar also has a generally vertical terminal portion 28 provided with a releasable latch assembly 30 for releasably securing the support bar to a bracket 32 which is secured to the rear wall 12.

The bracket 32 may be secured to the rear wall 12 as by welding or by bolts, not shown. The bracket 32 is generally channel-shaped, having laterally spaced apart, parallel, vertical side flanges 38 and 40 and a base 42 connecting the side flanges. The side flanges 38, 40 have elongated vertical detents in the form of slots 44 and 46. The base 42 has elongated vertical slots 47 and 48. See FIGS. 1 and 1A.

Figure 6:
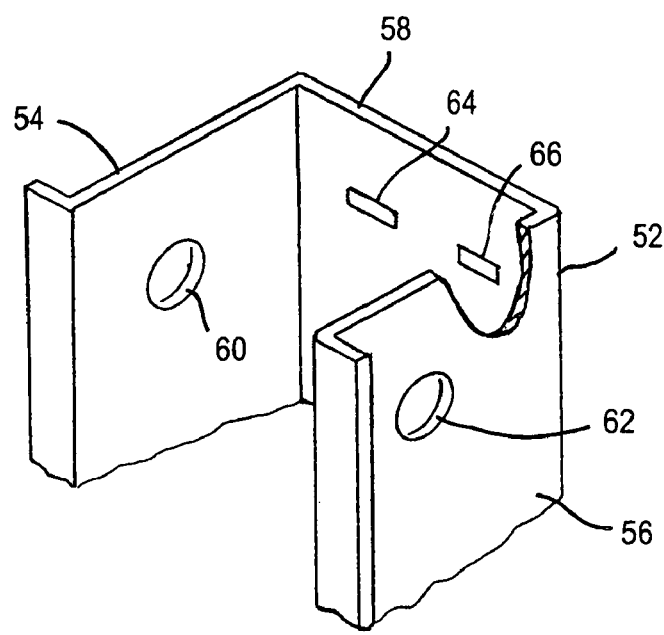
FIG. 6 is a detail view in perspective of the housing which forms part of the latch assembly.

The releasable latch assembly 30 comprising a housing 52. The housing 52 is generally channel-shaped, having laterally spaced apart, parallel side walls 54 and 56 connected by a base 58. The side walls 54 and 56 of the housing 52 have aligned holes 60 and 62. The base 58 of the housing has laterally extending slots 64 and 66. See FIGS. 1, 1A and 6.

The purpose of the slots 44, 46, 47 and 48 in the bracket 32, and of the slots 64 and 66 in the housing 52 will become apparent as the description proceeds.

An elongated tubular cylinder 68 extends between the side walls 54 and 56 of the housing 52 and is connected to the base 58 of the housing by a cylinder mount in the form of supporting plates 70. The cylinder 68 is aligned with the holes 60 and 62 in the side walls 54 and 56 of the housing 52 and has diametrically opposite longitudinally extending parallel guide slots 72 and 74 in the tubular wall of the cylinder, and ports 76 and 78 in opposite ends of the cylinder. The cylinder 68 encloses a spring as will be described more fully hereinafter. See FIGS. 1, 1A and 3–5.

Latch fingers 80 and 82 are in the housing 52. The latch finger 80 has an inner portion 84 which extends through the guide slots 72 and 74 of the cylinder 68, and a knob 86 which extends through the port 76 in one end of the cylinder. The latch finger 80 has an outer end portion which extends through the slot 64 in the base 58 of the housing 52, and through the slot 47 in the base 42 of the bracket 32. A right angle tip 88 on the outer end of the finger 80 is perpendicular to the flange 38 of the bracket 32 to facilitate entry into the slot 44.

The latch finger 82 has an inner end portion 90 which extends through the guide slots 72 and 74 of the cylinder 68, and a knob 92 which extends through the port 78 in the opposite end of the cylinder. The latch finger 82 has an outer end portion which extends through the slot 66 in the base 58 of the housing 52, and through the slot 48 in the base 42 of the bracket 32. A right angle tip 94 on the outer end of the finger 82 is perpendicular to the flange 40 of the bracket 32 to facilitate entry into the slot 46.

The guide slots 72 and 74 guide the lateral movement of the latch fingers 80 and 82. The knobs 86 and 92 assist the guide slots 72 and 74 in guiding the movement of the latch fingers 80 and 82.

An actuator comprises a compression coil spring 96 in the cylinder 68 which presses on the knobs 86 and 92 of the latch fingers 80 and 82 to move the latch fingers laterally outwardly to maintain the finger tips 88 and 94 engaged in the slots 44 and 46 in the side flanges 38 and 40 of the bracket 32 to latch the support bar 22 to the bracket. See FIGS. 3 and 4.

Release members 98 and 100 are slidably engaged in the holes 60 and 62 in the side walls 54 and 56 of the housing 52. The release members may be manually pressed inwardly to engage the knobs 86 and 92 and move the fingers 80 and 82 laterally inwardly to disengage the finger tips 88 and 94 from the slots 44 and 46 to thereby release the support bar 22 from the bracket 32.

The slots 44, 46, 47 and 48 in the bracket 32 are vertically elongated to allow for slight variations in the height of the bench 25 upon which the jump seat 18 rests.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A removable jump seat assembly for an automotive vehicle comprising,
    a jump seat,
    a support structure for the jump seat including at least one support bar having a first terminal portion connected to the jump seat,
    a bracket adapted to be mounted on a rear upright wall of the vehicle, and
    a releasable latch assembly for releasably securing the support bar to said bracket,
    said latch assembly comprising a housing on a second terminal portion of the support bar,
    a first latch finger in said housing engageable in a first recess in said bracket to connect said support bar to said bracket,
    an actuator in said housing urging said first latch finger into said first recess, and
    a release member carried by said housing for withdrawing said first latch finger from said first recess against the force of the actuator.

2. The removable jump seat assembly of claim 1, wherein said bracket has laterally spaced first and second flanges, said first recess being provided in said first flange, a second latch finger in said housing engageable in a second recess in the second flange, said actuator comprising a spring extending between said first and second latch fingers and urging said latch fingers laterally outwardly for engagement in the respective recesses, said housing is generally channel-shaped, having laterally spaced side walls, aligned first and second holes in the respective first and second side walls, and a second release member for withdrawing the second latch finger from the second recess, said first and second release members being movable in the respective first and second holes toward and away from each other and when moved toward each other forcing said latch fingers out of said recesses.

3. A removable jump seat assembly for an automotive vehicle, comprising,
    a jump seat,
    a support structure for the jump seat including at least one support bar having a first terminal portion connected to the jump seat,
    a bracket adapted to be mounted on a rear upright wall of the vehicle,
    said bracket being generally channel-shaped and having laterally spaced apart first and second flanges, and
    a releasable latch assembly for releasably securing the support bar to said bracket,
    said latch assembly comprising a housing on a second terminal portion of the support bar,
    said housing being generally channel-shaped and having laterally spaced apart first and second side walls,
    a first latch finger in said housing engageable in a first recess in said first flange,
    a second latch finger in said housing engageable in a second recess in said second flange,
    an actuator urging said first and second latch fingers into the respective first and second recesses,
    a first release member carried by said first side wall for withdrawing said first latch finger from said first recess against the force of said actuator, and
    a second release member carried by said second side wall for withdrawing said second latch finger from said second recess against the force of said actuator.

4. The removable jump seat assembly of claim 3, wherein said first recess comprises a first slot and said second recess comprises a second slot.

5. The removable jump seat assembly of claim 4, wherein said first and second slots are laterally aligned with each other, said latch fingers are laterally spaced apart from each other, and said actuator comprises a spring disposed between and bearing against said latch fingers to press said latch fingers laterally outwardly for engagement in the respective first and second slots.

6. The removable jump seat assembly of claim 5, further including first and second holes in the respective first and second side walls of said housing, said first and second release members being movable in the respective first and second holes toward and away from each other and when moved toward each other forcing said latch fingers out of said slots.

7. The removable jump seat assembly of claim 6, wherein said spring is supported in an elongated, tubular cylinder, and a cylinder mount attaching said cylinder to the housing.

8. The removable jump seat assembly of claim 7, wherein said cylinder has longitudinally extending, diametrically opposed guide slots, said first latch finger extending through said guide slots at one end of said cylinder in contact with one end of said spring, said second latch finger extending through said guide slots at an opposite end of said cylinder in contact with an opposite end of said spring, said guide slots guiding said latch fingers for laterally inward and outward movement.

9. The removable jump seat assembly of claim 8, further including knobs on the respective latch fingers engageable in first and second ports in the ends of said cylinder, said knobs cooperating with said guide slots in guiding said latch fingers for laterally inward and outward movement.

10. The removable jump seat assembly of claim 9, further including a bench upon which the jump seat is adapted to rest, and wherein said first and second slots are vertically elongated to receive said fingers despite variations in height of the bench.

11. The removable jump seat assembly of claim 10, wherein the fingers have tips and only such tips are engageable in the respective first and second slots.

12. The removable jump seat assembly of claim 11, wherein said tips of said fingers extend perpendicular to the respective first and second flanges to facilitate entry of the tips into the slots in said flanges.

\* \* \* \* \*